United States Patent [19]
Montgomery et al.

[11] Patent Number: 6,052,215
[45] Date of Patent: Apr. 18, 2000

[54] INDEX-GUIDED SOLID ACOUSTIC TRAVELING WAVE LENS

[75] Inventors: Robert M. Montgomery; Reeder N. Ward, both of Indialantic; Mark T. Montgomery, Melbourne Beach; Pat O. Bentley, West Melbourne, all of Fla.

[73] Assignee: Harris Corporation, Melbourne, Fla.

[21] Appl. No.: 09/235,697

[22] Filed: Jan. 22, 1999

[51] Int. Cl.[7] .................. G02F 1/11; G02F 1/33; G02F 1/335
[52] U.S. Cl. .......... 359/285; 359/305; 359/313; 385/7
[58] Field of Search ................. 385/7; 359/285, 359/305, 313

[56] References Cited

U.S. PATENT DOCUMENTS

| | | | |
|---|---|---|---|
| 3,676,592 | 7/1972 | Foster | 178/7.6 |
| 5,801,874 | 9/1998 | Montgomery | 359/305 |

Primary Examiner—Georgia Epps
Assistant Examiner—Adrianne Riviere
Attorney, Agent, or Firm—Charles E. Wands

[57] ABSTRACT

A solid state acoustic travelling wave lens comprises a thin core layer of acoustic and light transmissive material, such as crystalline quartz, compression-bonded between a pair of outer or cladding layers, such as fused silica, having an acoustic velocity that is only slightly higher than (e.g., less than five percent of) that of the core material. The acoustic mode field characteristic of the weakly guiding device contains no spatial variations caused by Fresnel diffraction in an unguided wave device. In a second embodiment, shear stress coupling between the core and cladding layers is inhibited by interposing very thin liquid boundary layers between the core layer and the cladding layers. Such thin liquid boundary layers, which are relatively more compressible than the core and cladding material, allow longitudinal waves to be transmitted across the core/cladding boundary (through the liquid), but prevent transmission of shear waves therebetween.

19 Claims, 3 Drawing Sheets

INDEX-GUIDED SOLID ACOUSTIC TRAVELING WAVE LENS

FIELD OF THE INVENTION

The present invention relates in general to laser beam scanning systems, and is particularly directed to a solid acoustic traveling wave lens (ATWL) produced in an acoustic waveguide made of solid materials. The solid ATWL of the invention is comprised of a very thin layer of acoustic and light transmissive core material, such as crystalline quartz, that is interposed or laminated between a pair of outer or cladding layers, such as fused silica, having an acoustic velocity which is only slightly higher than that of the core.

BACKGROUND OF THE INVENTION

FIG. 1 diagrammatically illustrates the configuration of a conventional guided acoustic travelling wave lens device—one that employs a relatively narrowly dimensioned traveling wave channel. The devicers comprises a laser 10, the optical beam output 11 of which is focussed by a cylindrical lens arrangement 12 and deflected by a mirror 13 onto an acousto-optic beam deflector 14, to which an RF input signal is applied. The acousto-optically modulated beam is then reimaged by a further spherical-cylindrical lens arrangement 15 onto a traveling lens cell 16, than contains a traveling wave lens transport medium 17 and a traveling wave lens launching transducer 18. The scanned beam is then imaged onto an image collection medium, such as a photographic film 19.

In a number of applications, the acousto-optic waveguide may be configured as a reduced height, guided acoustic travelling wave lens (ATWL), such as the liquid ATWL configuration diagrammatically illustrated at 30 in FIG. 2. In this type of acoustic wave transmission architecture, a first end 32 of the ATWL 30 has an acoustic wave input aperture 34, to which an acoustic wave-launching piezo-electric transducer is coupled, at an input end of a relatively narrow (e.g., fluid-containing) channel 36, having a cross-section of width w and height h, where w>>h.

For a non-limiting illustration of examples of documentation describing guided acoustic traveling wave lens devices, attention may be directed to an article entitled: "Optical Beam Deflection Using Acoustic-Traveling-Wave Technology," by R. H. Johnson et al, presented at the SPIE Symposium On Optical, Electro-Optical, Laser and Photographic Technology, August 1976, FIG. 6 of which corresponds to FIG. 1, above, an article entitled: "Guided acoustic traveling wave lens for high-speed optical scanners," by S. K. Yao et al, Applied optics, Vol. 18, pp 446–453, February 1979, and the U.S. Pat. No. 3,676,592 to Foster.

In the device described in the Yao et al article, the device is a solid ATWL guided structure, but not an index guided device. The length of scan is limited by dispersion, and the structural strength is limited by the narrow guide height. In the device described in the Foster patent, the ATWL uses a liquid as the acousto-optic medium and not index guided. In general liquids are difficult to impedance-match and the liquid containment packaging is typically complex.

The diameter of the laser beam spot incident upon a ATWL may be on the order of one-quarter of the acoustic wavelength, and may have a diameter on the order of twenty to thirty microns, and the focal length of the acoustic travelling wave lens may be several tens of a wavelength. In this configuration, an acoustic wavelength of one millimeter or greater is required, to achieve a resolution gain in excess of a factor of ten.

A disadvantage of an unguided ATWL is the fact that, depending upon the length of the scan of the incident light beam, the height of the piezoelectric transducer and the acoustic lens may be on the order of ten to fifteen millimeters. This height, which is considerably greater than that required by the limited diameter light spot incident upon the device, is necessary in order to control the acoustic diffraction, as the travelling wave lens scans out away from the transducer. Even using a relatively tall transducer, there are still significant diffraction effects as the acoustic beam passes through the near field or Fresnel diffraction zone.

SUMMARY OF THE INVENTION

In accordance with a first embodiment of the invention, this shortcoming of conventional ATWLs is successfully obviated by a new and improved solid ATWL, in which a very thin core layer of acoustic and light transmissive material, such as crystalline quartz, is compression-bonded between a pair of outer or cladding layers, such as fused silica, that have an acoustic velocity that is only slightly higher than (e.g., less than five percent of) that of the core material. Because of this very slight mismatch between the acoustic velocities of the core and cladding material, the acoustic wave traveling through the solid state ATWL is relatively weakly guided, with the acoustic mode field distribution characteristic (and associated acoustic intensity) having a generally linear slope at the interface between the core and cladding layers. Since the acoustic mode field does not contain spatial variations caused by Fresnel diffraction in an unguided wave device, the guided ATWL device of the present invention makes it possible to implement a scanner having a very long scan length.

Because the acoustic velocity differential between the core and cladding layers of the present invention is very small, there is the potential for substantial coupling of shear waves between the two. In accordance with a second embodiment of the invention, such shear stress coupling can be substantially inhibited by interposing very thin liquid boundary layers between the core layer and the cladding layers. Such thin liquid layers, which are relatively more compressible than the core and cladding material, allow longitudinal waves to be transmitted across the core-cladding boundary (through the liquid), but prevent transmission of shear waves therebetween.

Varying the thickness of either or both of the liquid layers serves to modify the properties of the waveguide. The thicker the liquid layer, the greater pressure relief at the liquid/solid boundary. For relatively thick liquid layers, the acoustic wave propagates in the core in an extensional wave mode, which is somewhat slower than a bulk pressure wave. This implies that the waveguide confinement effect of the invention can be obtained even when the core and cladding layers are made of the same material.

DETAILED DESCRIPTION

Figure 1:
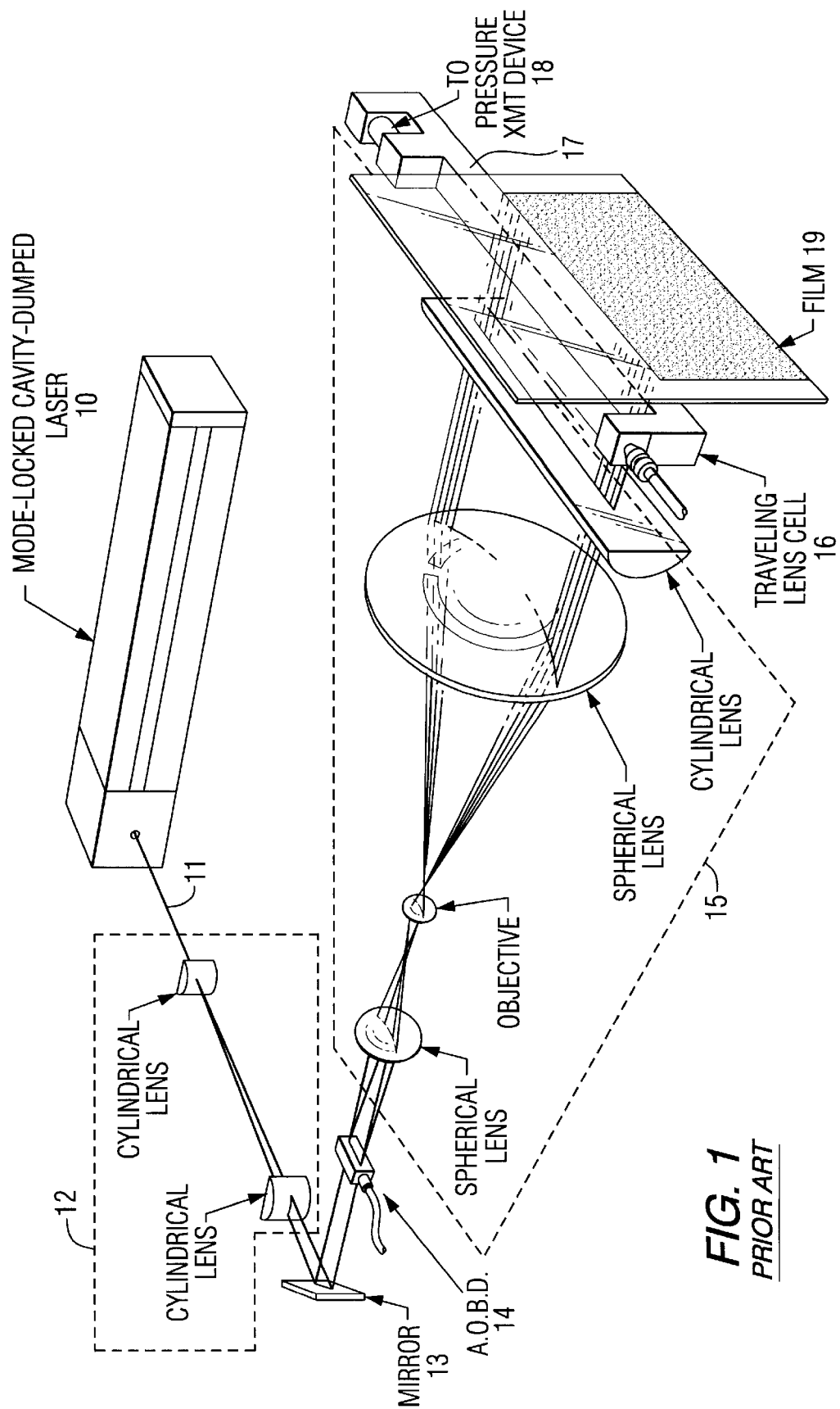
FIG. 1 diagrammatically illustrates a conventional guided acoustic travelling wave lens device.
Figure 2:
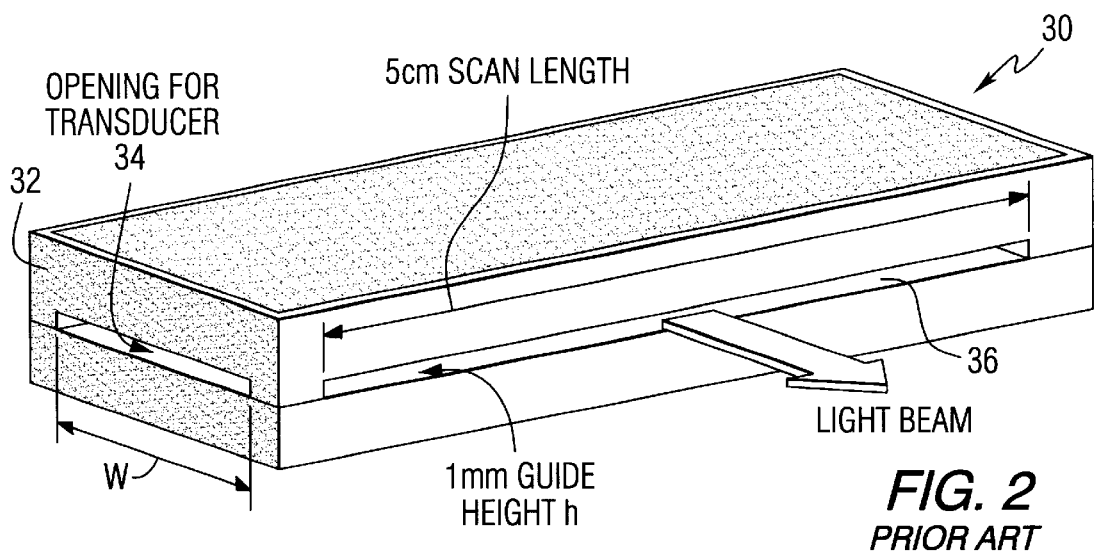
FIG. 2 diagrammatically illustrates a liquid acoustic traveling wave lens waveguide of a fixed narrow rectangular channel cross-section of fixed width and height.
Figure 3:
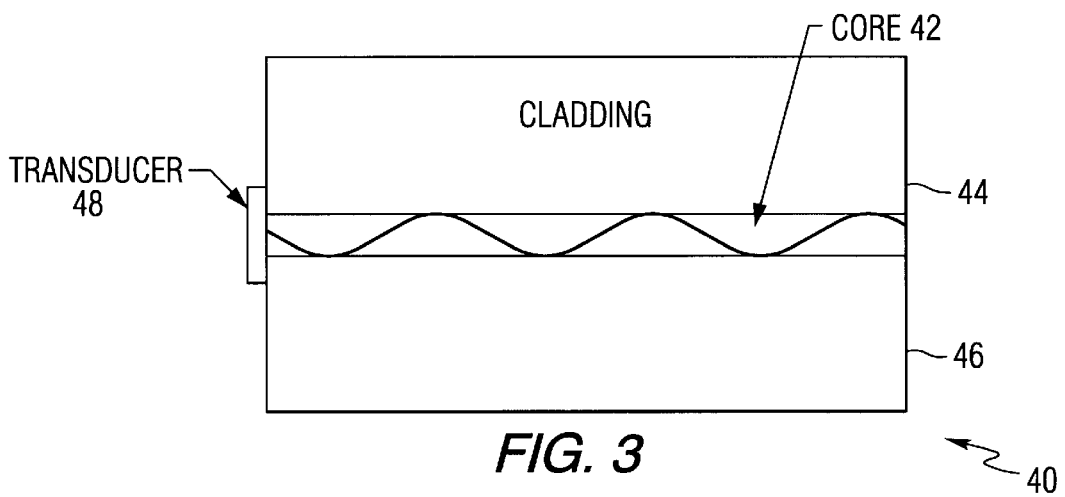
FIG. 3 diagrammatically illustrates a solid state laminated ATWL in accordance with a first embodiment of the present invention, wherein solid cladding layers are bonded to opposite sides of a solid core layer.

As described briefly above, to reduce the unwanted diffraction effects present in a conventional ATWL, the index guided solid ATWL of the present invention is configured as diagrammatically illustrated in FIG. 3 as a 'weakly guided' solid laminated ATWL waveguide structure 40. In this structure, a very thin, generally rectangularly configured layer of acoustic and light transmissive core material 42 is confined or 'sandwiched' between and compression-bonded to a pair of generally rectangularly configured outer cladding layers- or plates 44 and 46, having an acoustic velocity index that is only slightly higher than that of the core material 42. A piezo-electric transducer 48 for launching an ATWL into the waveguide 40 is mounted to one end of the structure, as shown.

As a non-limiting example, the thin core material 42 may comprise crystalline quartz, which has an acoustic velocity index of 5.72 km/ms, having a width on the order of 1 cm, and a thickness on the order of 1 mm. For an acoustic wavelength of 1 mm, the maximum thickness of the core layer 42 for single mode propagation is on the order 1.7 mm. The outer cladding layers 44 and 46 may comprise 1 cm wide plates of fused silica, which has an acoustic velocity index of 5.95 km/ms. The resulting structure has a effective refractive index variation of 0.04.

The thickness of each of the cladding layers 44 and 46 is not limited to an particular value, but may have a thickness on the order of 3–4 mm, as a non-limiting, practical example, to facilitate handling and the application of a compressive force (as by way of a clamp device) to the core layer 42. The thickness of the core layer 42 (for single mode propagation) may be on the order 1.6 mm, where the waveguide index ($\beta/k_0$) is 1.026.

Figure 4:
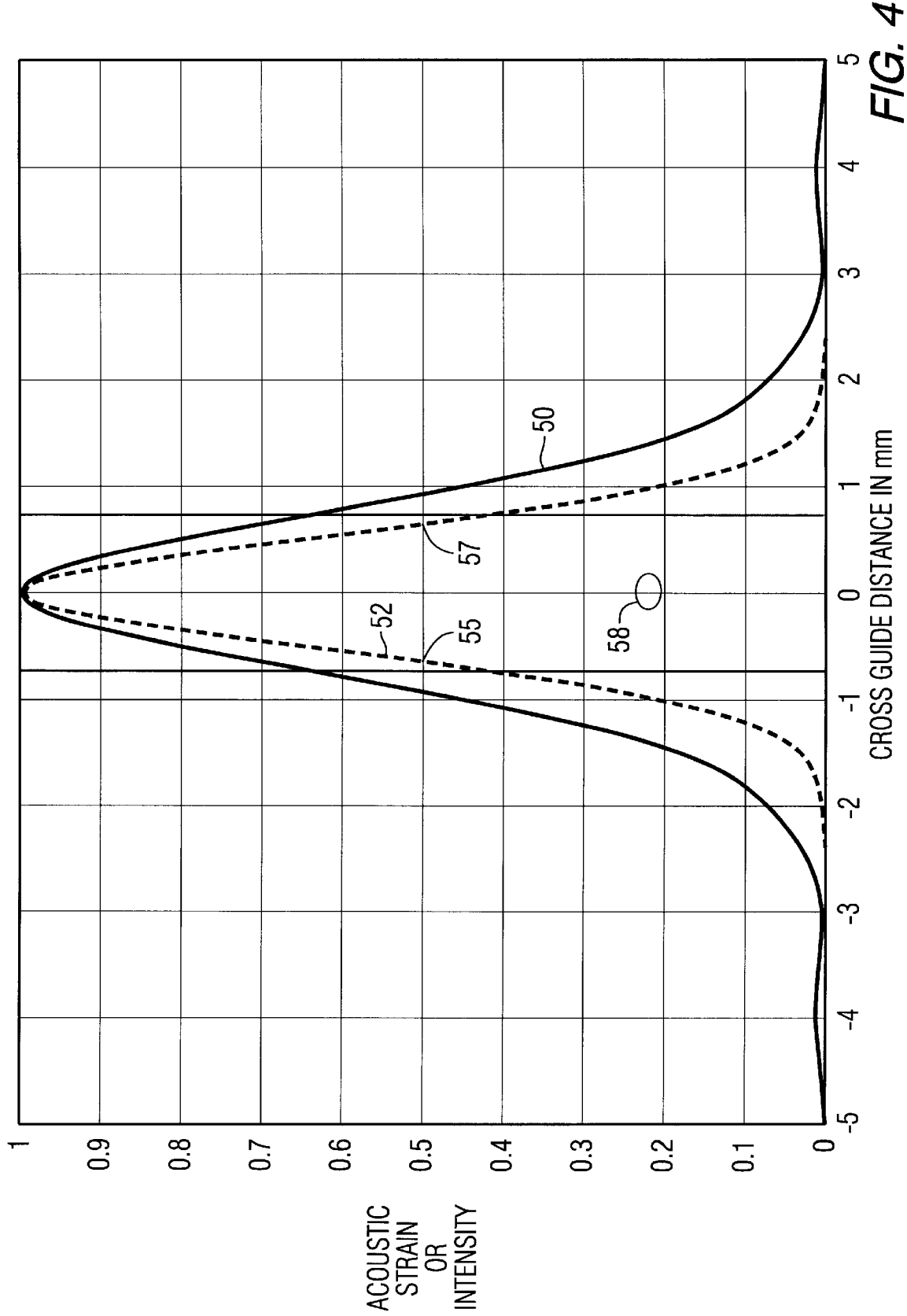
FIG. 4 shows the acoustic mode field distribution characteristic of the solid state laminated ATWL of FIG. 3.

The acoustic mode field distribution characteristic of such a device is diagrammatically illustrated in FIG. 4 has having a generally continuous contour 50, which crosses from the interior or core layer 42 into the cladding layers 44 and 46. The associated acoustic intensity (power density) is shown in broken lines 52. This characteristic shows the power density 52 to be about 1.3 mm wide at the half intensity points 55 and 57. For a typical ATWL, this corresponds to a height reduction of 7:1 and a power savings of five times or more. The cross-section of a typical scanning light beam transversely incident upon the core layer 42 is shown at 58.

In addition to power savings, the acoustic mode field does not contain spatial variations caused by Fresnel diffraction in an unguided wave device. As a consequence, the guided wave device of the present invention makes it possible to implement a scanner having a very long scan length. When employed as a resonant waveguide scanner, such a guided structure can confine the scanned pulse between a pair of reflecting surfaces at the opposite ends of the waveguide, so that the acoustic power is recirculated rather than dissipating at the end of the scan line.

As pointed out above, the very slight acoustic velocity differential between the core and cladding layers of the ATWL of the invention produces a weakly guided acoustic waveguide structure, that is operative to substantially reduce unwanted diffraction effects present in a conventional ATWL device. Because the acoustic velocity differential is small, there is the potential for substantial coupling of shear waves from the core layer to the cladding layer.

Figure 5:
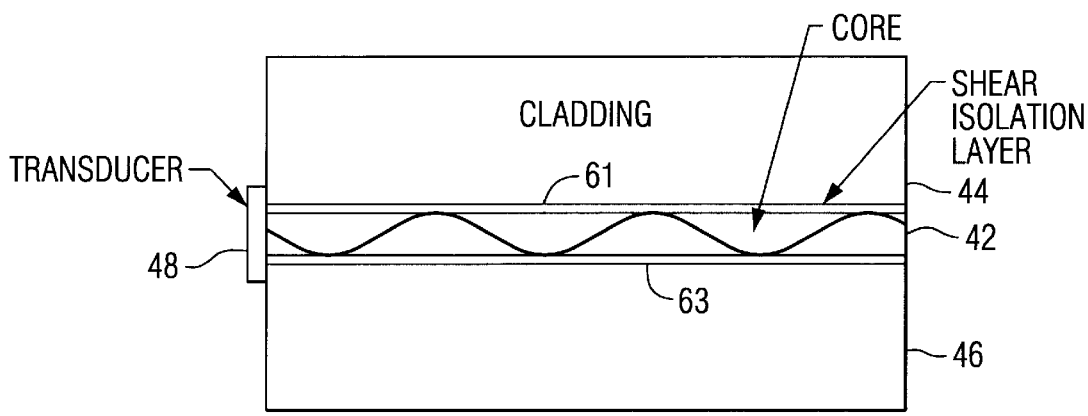
FIG. 5 diagrammatically illustrates a solid state laminated ATWL in accordance with a second embodiment of the invention, in which very thin liquid layers are interposed between the core and cladding layers to inhibit coupling of shear waves therebetween.

In accordance with a second embodiment of the invention, diagrammatically illustrated in FIG. 5, such coupling is suppressed by interposing very thin liquid (e.g., water) layers 61 and 63 (e.g., having a thickness on the order of 10 microns or 0.01 of the acoustic wavelength) between the core layer 42 and the cladding layers 44 and 46. Such thin liquid layers (which are relatively more compressible than the core and cladding material) between the core and cladding layers allows longitudinal waves to be transmitted across the boundary (through the liquid) between the core and cladding layers, but prevents the transmission of shear waves therebetween.

The thickness of either or both of the liquid layers 61, 63 may be adjusted to modify the properties of the solid state waveguide of the invention. As the thickness of a liquid layer increases there is more pressure relief at the liquid/solid boundary. For relatively thick liquid layers, the acoustic wave propagates in the core layer 42 in an extensional wave mode, which is somewhat slower than a bulk pressure wave. This implies that, for the second embodiment, where an intermediate liquid layer is provided between the core and cladding layers, the waveguide confinement effect of the invention can be obtained even when the core and cladding layers are made of the same material. The pressure relief due to the relatively compressible liquid interface creates the required slow wave guiding structure of the invention.

While we have shown and described several embodiments in accordance with the present invention, it is to be understood that the same is not limited thereto but is susceptible to numerous changes and modifications as are known to a person skilled in the art, and we therefore do not wish to be limited to the details shown and described herein, but intend to cover all such changes and modifications as are obvious to one of ordinary skill in the art.

What is claimed:

1. An acoustic travelling wave lens for a narrow channel waveguide of an acousto-optic scanner, upon which a scanned optical beam to be modulated by an acoustic wave launched into said narrow channel waveguide by an acoustic transducer coupled thereto is incident, said acoustic travelling wave lens comprising a solid core layer of acoustic and light transmissive material, interposed between a pair of solid cladding layers of acoustic and light transmissive material, said cladding layers having an acoustic velocity different than that of said core layer.

2. An acoustic travelling wave lens according to claim 1, wherein said cladding layers have an acoustic velocity which is higher than that of said core layer.

3. An acoustic travelling wave lens according to claim 1, wherein said cladding layer has an acoustic velocity which is no more that five percent greater than that of said core layer.

4. An acoustic travelling wave lens according to claim 1, wherein said acoustic travelling wave lens has an acoustic mode field versus thickness characteristic that contains no spatial variations caused by Fresnel diffraction in an unguided wave device.

5. An acoustic travelling wave lens according to claim 1, wherein said core layer is bonded between said pair of cladding layers.

6. An acoustic travelling wave lens according to claim 1, further including shear wave transmission-inhibiting boundary layers between said core layer and cladding layers.

7. An acoustic travelling wave lens according to claim 6, wherein said shear wave transmission-inhibiting boundary layers comprise liquid layers.

8. An acoustic travelling wave lens according to claim 1, wherein said core layer comprises crystalline quartz and said cladding layers comprise fused silica.

9. An acoustic travelling wave lens for a narrow channel waveguide of an acousto-optic scanner, upon which a scanned optical beam to be modulated by an acoustic wave launched into said narrow channel waveguide by an acoustic transducer coupled thereto is incident, acoustic travelling wave lens comprising a solid core layer of acoustic and light transmissive material, installed between a pair of solid cladding layers of acoustic and light transmissive material, and shear wave transmission-inhibiting boundary layers between said core layer and cladding layers.

10. An acoustic travelling wave lens according to claim 9, wherein said shear wave transmission-inhibiting boundary layers comprise liquid layers.

11. An acoustic travelling wave lens according to claim 9, wherein said cladding layers have an acoustic velocity which is higher than that of said core layer.

12. An acoustic travelling wave lens according to claim 9, wherein said core layer comprises crystalline quartz and said cladding layers comprise fused silica.

13. For use with an acousto-optic scanner having a narrow channel acoustic waveguide containing an acoustic wave propagation medium, upon which a scanned optical beam modulated by an acoustic traveling wave launched through said narrow channel waveguide is incident, said narrow channel waveguide extending from a first end to which an acoustic transducer is coupled and a second end that terminates an acoustic traveling wave launched from said first end thereof, a method of confining acoustic energy propagating within said narrow channel waveguide comprising the steps of:

(a) configuring said acoustic wave propagation medium as a laminate arrangement of solid core layer of acoustic and light transmissive material, that is interposed between a pair of solid cladding layers of acoustic and light transmissive material; and (b) making said solid core layer of a material having an acoustic velocity which is different than that of said cladding layers.

14. A method according to claim 13, wherein said cladding layers have an acoustic velocity which is higher than that of said core layer.

15. A method according to claim 13, wherein said cladding layer has an acoustic velocity which is no more that five percent greater than that of said core layer.

16. A method according to claim 13, wherein step (a) comprises bonding said core layer between said pair of cladding layers.

17. A method according to claim 13, further including the step of:

(c) interposing shear wave transmission-inhibiting boundary layers between said core layer and cladding layers.

18. A method according to claim 17, wherein said shear wave transmission-inhibiting boundary layers comprise liquid layers.

19. A method according to claim 13, wherein said core layer comprises crystalline quartz and said cladding layers comprise fused silica.

* * * * *